US011859728B2

United States Patent
Wu et al.

(10) Patent No.: US 11,859,728 B2
(45) Date of Patent: Jan. 2, 2024

(54) ELECTRIC VALVE

(71) Applicant: Zhejiang Sanhua Climate and Appliance Controls Group Co., Ltd., Shaoxing Zhejiang (CN)

(72) Inventors: Hangi Wu, Shaoxing Zhejiang (CN); Minghui Xu, Shaoxing Zhejiang (CN)

(73) Assignee: ZHEJIANG SANHUA COMMERCIAL REFRIGERATION CONTROLS CO., LTD., Zhejiang (CN)

( * ) Notice: Subject to any disclaimer, the term of this patent is extended or adjusted under 35 U.S.C. 154(b) by 0 days.

(21) Appl. No.: 17/608,576

(22) PCT Filed: May 27, 2020

(86) PCT No.: PCT/CN2020/092464
§ 371 (c)(1),
(2) Date: Nov. 3, 2021

(87) PCT Pub. No.: WO2020/253480
PCT Pub. Date: Dec. 24, 2020

(65) Prior Publication Data
US 2022/0228671 A1     Jul. 21, 2022

(30) Foreign Application Priority Data

Nov. 20, 2019   (CN) .......................... 201922013399.8

(51) Int. Cl.
*F16K 31/04*     (2006.01)
*F16K 5/06*      (2006.01)
(Continued)

(52) U.S. Cl.
CPC .......... *F16K 31/047* (2013.01); *F16K 5/0647* (2013.01); *F16K 5/0689* (2013.01);
(Continued)

(58) Field of Classification Search
CPC .... F16K 31/047; F16K 5/0647; F16K 27/067; F16K 5/0689; F16K 27/06; F16K 31/04; F16K 31/041; F16K 31/53; F16K 31/535
(Continued)

(56) References Cited

U.S. PATENT DOCUMENTS 4,621,789 A * 11/1986 Fukamachi ........... F16K 31/045
                                                          185/43
4,760,989 A *  8/1988 Elliott ..................... F16K 31/05
                                                          74/25

(Continued)

FOREIGN PATENT DOCUMENTS

CN     1570436 A     1/2005
CN     2742255 Y     11/2005
(Continued)

OTHER PUBLICATIONS

Japanese Office Action dated Dec. 6, 2022 for Japanese Appl. No. 2021-562180.
(Continued)

*Primary Examiner* — John Bastianelli
(74) *Attorney, Agent, or Firm* — Ohlandt, Greeley and Perle, LLP

(57) ABSTRACT

An electric valve, comprising a housing component and a valve body component, wherein the housing component is fixedly connected to the valve body component; a control component comprises a motor, and a control component is provided in an inner cavity of the housing component. With respect to the background art, the influence of moisture on the motor can be reduced.

27 Claims, 9 Drawing Sheets

(51) Int. Cl.
*F16K 27/06* (2006.01)
*F16K 31/53* (2006.01)

(52) U.S. Cl.
CPC ............ *F16K 27/06* (2013.01); *F16K 27/067* (2013.01); *F16K 31/04* (2013.01); *F16K 31/041* (2013.01); *F16K 31/53* (2013.01); *F16K 31/535* (2013.01)

(58) Field of Classification Search
USPC ........................................ 251/129.11–129.13
See application file for complete search history.

(56) References Cited

U.S. PATENT DOCUMENTS

| | | | |
|---|---|---|---|
| 4,858,827 A * | 8/1989 | Fletcher | A01G 25/16 239/69 |
| 6,186,471 B1 * | 2/2001 | Genga | F16K 31/046 251/71 |
| 6,367,768 B1 | 4/2002 | Brocard et al. | |
| 8,408,518 B2 * | 4/2013 | Schade | F16K 31/53 251/83 |
| 8,794,591 B2 * | 8/2014 | Arai | F01L 1/352 251/248 |
| 2006/0180780 A1 * | 8/2006 | Arai | F16K 31/04 123/568.23 |

FOREIGN PATENT DOCUMENTS

| | | |
|---|---|---|
| CN | 202992332 U | 6/2013 |
| CN | 203115165 U | 8/2013 |
| CN | 104482253 A | 4/2015 |
| CN | 202992332 U | 4/2015 |
| CN | 205226560 U | 5/2016 |
| CN | 207161837 U | 3/2018 |
| CN | 208651778 U | 3/2019 |
| JP | 62032272 A | 2/1987 |
| JP | 2007113626 A | 5/2007 |
| JP | 2008025586 A | 2/2008 |

OTHER PUBLICATIONS

International Search Report dated Jul. 29, 2020 for PCT Application No. PCT/CN2020/092464.

* cited by examiner

ELECTRIC VALVE

CROSS-REFERENCED APPLICATIONS

This application is the national phase of international application No. PCT/CN2020/092464, titled "ELECTRIC VALVE", filed on May 7, 2020, which claims the benefit of priorities to the following two Chinese patent applications, both of which are incorporated herein by reference,
1) Chinese Patent Application No. 201920938666.X, titled "ELECTRIC VALVE", filed with the China National Intellectual Property Administration on Jun. 21, 2019; and
2) Chinese Patent Application No. 201922013399.8, titled "ELECTRIC VALVE", filed with the China National Intellectual Property Administration on Nov. 20, 2019.

BACKGROUND

1. Field of the Disclosure

The present application relates to the technical field of fluid control, and in particular to an electric valve.

2. Discussion of the Background Art

FIG. 1 is a schematic sectional view of an electric valve in the conventional technology. As shown in FIG. 1, the electric valve includes a cover body 01, a valve body 02, a coil 03 and a rotor 04, the cover body 01 is fixed to the valve body 02 by welding, the rotor 04 is arranged inside the cover body 01, and the coil 03 is arranged outside the cover body 01. In this structure, since the coil 03 is always exposed to the environment, short-circuit damage may be caused due to the influence of moisture in the environment.

Therefore, how to reduce the influence of the moisture in the environment on the coil provides an issue to improve for those skilled in the art.

SUMMARY

An object of the present application is to provide an electric valve, which includes a housing component, a valve body component, a control component and a gear reduction mechanism. The housing component is fixedly connected to the valve body component, a valve chamber of the electric valve includes an inner chamber of the housing component and an inner chamber of the valve body component, and the inner chamber of the housing component is in communication with the inner chamber of the valve body component. The control component and the gear reduction mechanism are arranged in the inner chamber of the housing component. The control component includes a motor and an input gear. The motor is rotatably connected with the input gear. A stator and a rotor of the motor are located above the gear reduction mechanism. The gear reduction mechanism includes a planetary gear and an output gear carrier, the input gear meshes with the planetary gear, and the planetary gear is configured to drive the output gear carrier to rotate. The valve body component includes a valve body, a first valve seat, a valve core and a transmission shaft, the valve body is fixedly connected to the first valve seat, the valve core is arranged in the inner chamber of the valve body component, the output gear carrier is rotatably connected to the transmission shaft, and the transmission shaft is rotatably connected to the valve core.

In the electric valve according to the present application, the housing component is fixedly connected to the valve body component, the control component includes the motor, and the control component is arranged in the inner chamber of the housing component. Compared with the conventional technology, the influence of moisture on the motor can be reduced.

BRIEF DESCRIPTION OF THE DRAWINGS

FIG. 10b is a schematic view showing the cooperation of a rotating shaft, a transmission rod, and an input gear in FIG. 10a.

Figure 1:
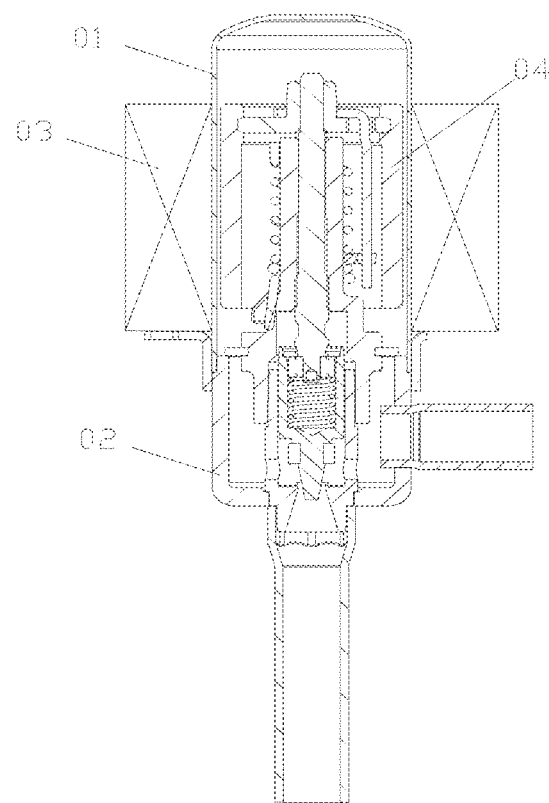
FIG. 1 is a schematic sectional view of an electric valve given in the conventional technology.

Reference numerals in FIGS. 2 to 13 are as follows:

| | |
|---|---|
| 1 control component; | |
| 11/11' motor, | 111/111' rotating shaft; |
| 112/112' input gear; | 1120/1120' sun gear; |
| 1121 large-diameter portion; | 1122 small-diameter portion; |
| 1123 groove of large-diameter portion; | |
| 1124 groove wall portion, | 1125 protruding ring; |
| 113 stator; | 114 rotor; |
| 115 upper bearing; | 116 lower bearing; |
| 117 transmission rod; | 1171 side wall portion; |
| 12 lead wire; | 13 mounting plate; |

-continued 130 gap;
 2 gear reduction mechanism;
  21 planetary gear,    22 planetary gear carrier;
  221 first-stage planetary gear carrier;
 2210 center through hole;  23 positioning rod;
 24 separator;      240 communication flow path;
 241 center hole;
 242 through hole;     243 radial through groove;
 244 annular groove;
  25 gear ring;      250 inner chamber of gear ring;
 251 limiting groove;
  26 output gear carrier,   261 disc-shaped body portion;
 262 hole portion;     263 protruding portion of disc-shaped body portion;
 27/27A/27B bearing member; 271/271A cylindrical portion;
 272/272A radially extending portion;
 273A axially extending portion; 274/274A axial through groove;
 275 notch portion;
 3/3A valve body component,  30 inner chamber of valve body component,
 31/31A valve body;
311/311A body portion,    312/312A extending portion;
 313 limiting boss;     314 recess portion;
3120A axial through hole;   32 valve core;
 321 groove of valve core;
 33/33A first valve seat;    33' second valve seat;
  34 transmission shaft;   341 first key portion;
 342 second key portion;   343 blind hole;
  36 first connecting pipe;  37 second connecting pipe;
  4 housing component,   40 inner chamber of housing component,
 401 upper chamber;
 41 upper housing;     411 protruding portion of upper housing;
 42 lower housing;     421 second stepped portion;
 422 reduced-diameter portion;
  5 plug-in component;   51 plug-in socket;
511 upper portion;      5110 plug-in chamber;
512 middle portion;
513 lower portion;      5130 sealing chamber;
514 first stepped portion;
 52 sealing glass;      53 pin.

DETAILED DESCRIPTION OF THE PREFERRED EMBODIMENTS

In the electric, valve according to the present application, the housing component is fixedly connected to the valve body component, the control component includes the motor, and the control component is arranged in the inner chamber of the housing component. A control component includes a motor, and the control component is arranged in the inner chamber of the housing component. Compared with the conventional technology, the influence of moisture on the motor can be reduced.

In order to enable those skilled in the art to better understand the technical solutions of the present application, the present application will be further described in detail with reference to the drawings and specific embodiments.

It should be noted that, the orientation terms, such as upper and lower, involved in this application are defined with reference to the positions of the components in the figures and the relative positions of the components as shown in FIGS. 2 to 13, which are only for clarity and ease of describing the technical solutions. It will be appreciated that, those orientation terms used herein should not limit the protection scope of the present application.

It should be further noted that, the "rotation" referred to herein refers to movement in a circumferential direction, which includes not only rotation by one circle (360 degrees) or more, but also rotation by one circle (360 degrees) of less.

Figure 2:
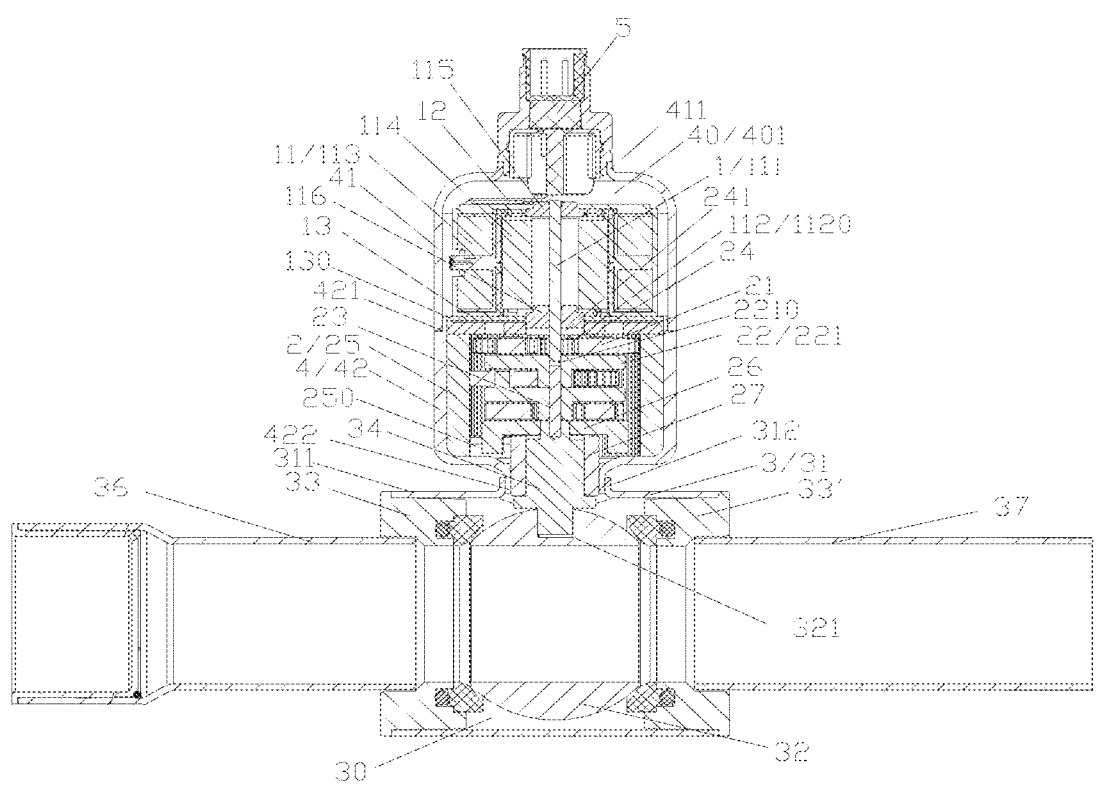
FIG. 2 is a schematic sectional view of an electric valve according to the present application.
Figure 3:
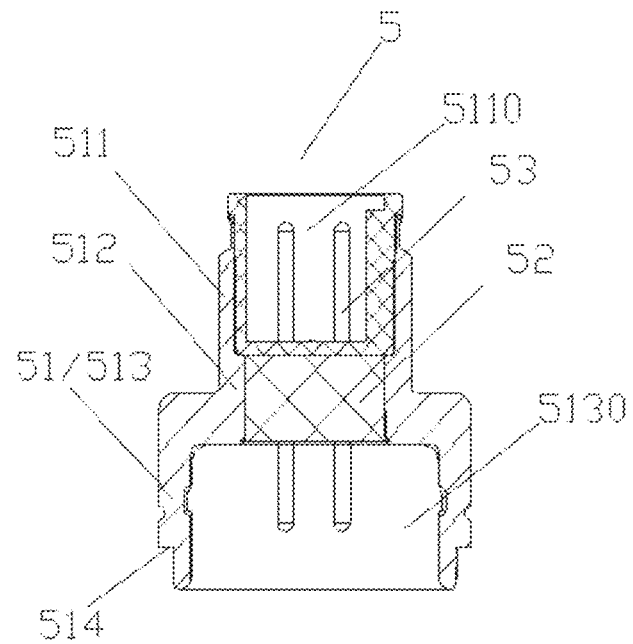
FIG. 3 is a schematic structural view of a plug-in component in FIG. 2.
Figure 4A:
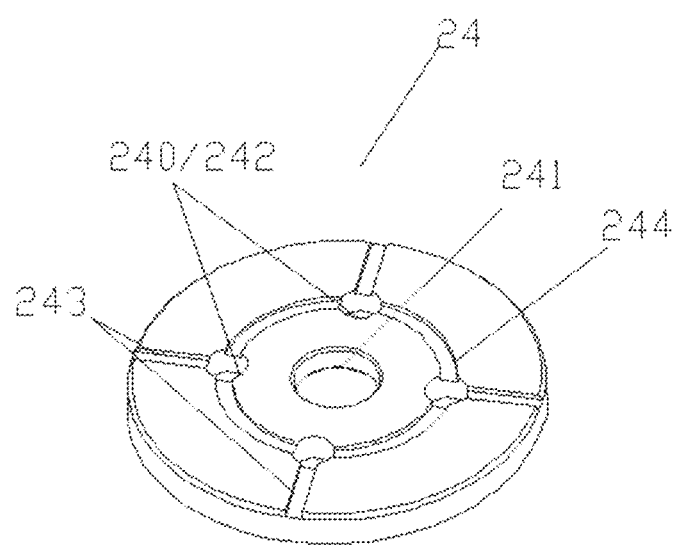
FIG. 4a is a schematic structural view of a separator in FIG. 2.
Figure 4B:
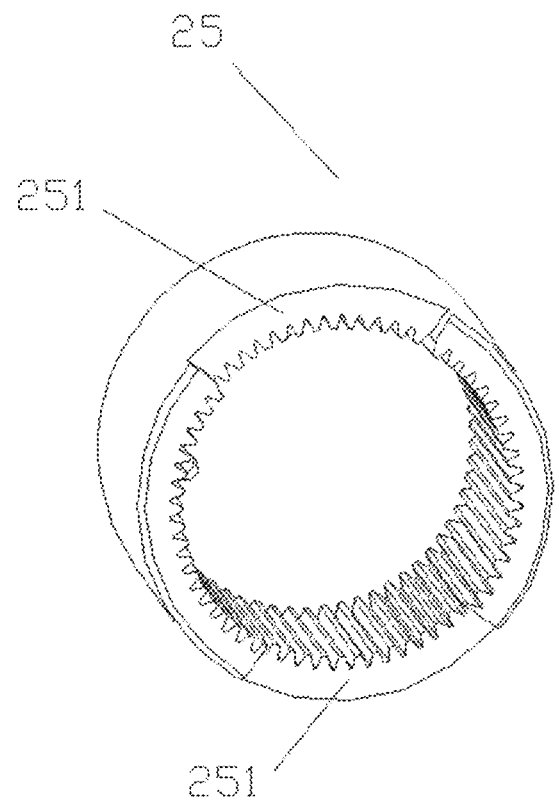
FIG. 4b is a schematic structural view of a gear ring in FIG. 2.
Figure 5:
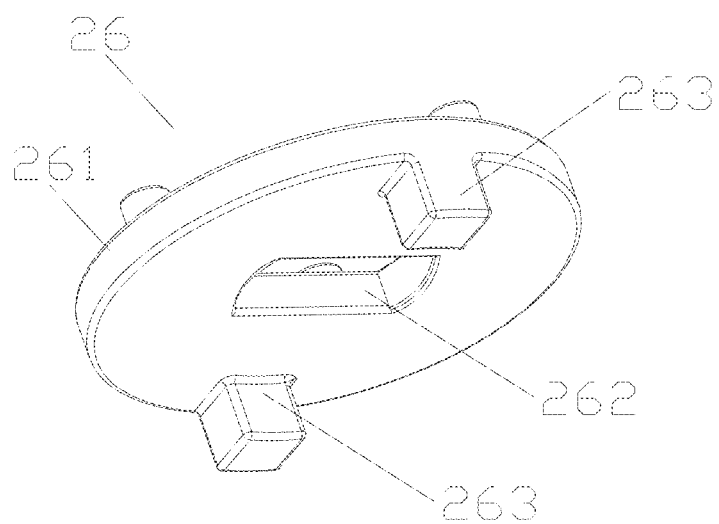
FIG. 5 is a schematic structural view of an output gear carrier in FIG. 2.
Figure 6:
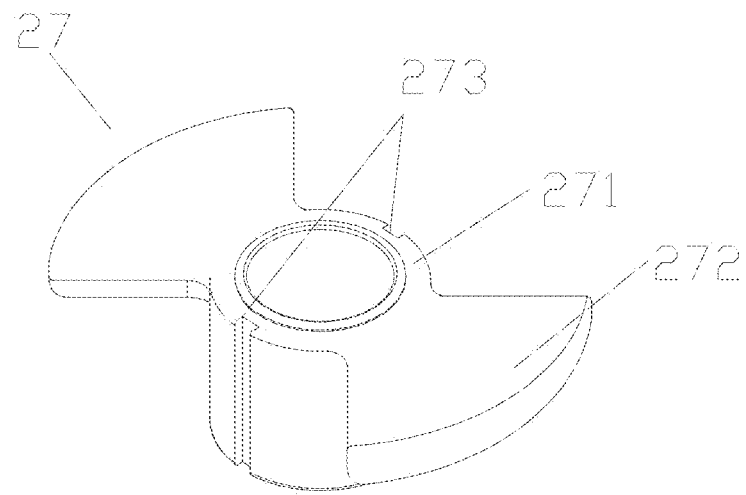
FIG. 6 is a schematic structural view of a bearing member in FIG. 2.
Figure 7:
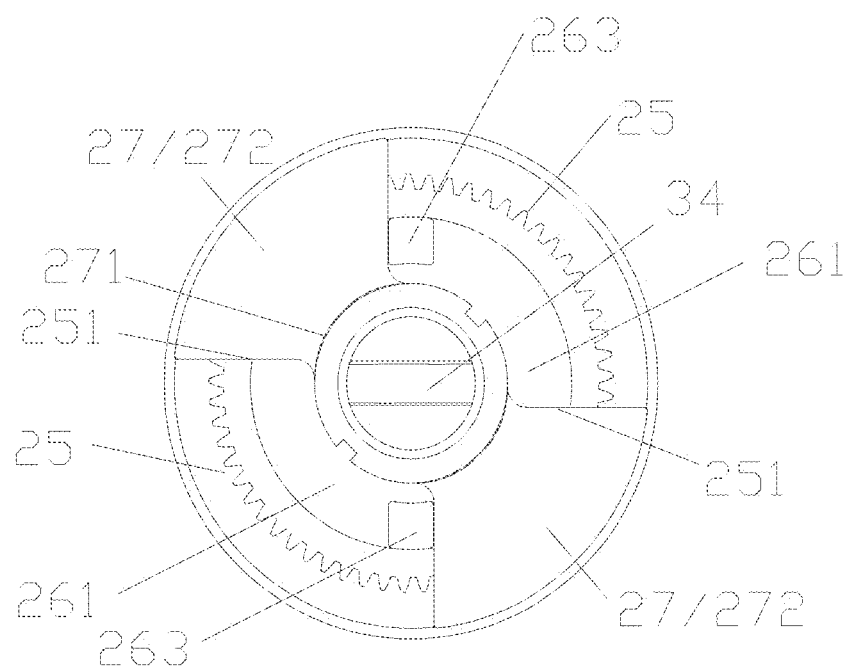
FIG. 7 is a schematic view showing the cooperation of the gear ring, the output gear carrier and the bearing member in FIG. 2.
Figure 8:
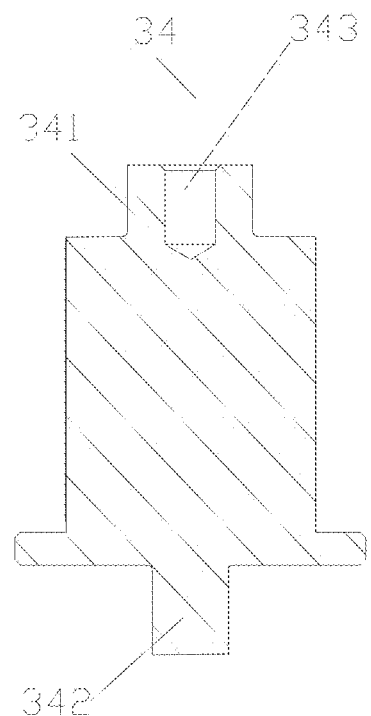
FIG. 8 is a schematic sectional view of a transmission shaft in FIG. 2.

FIG. 2 is a schematic sectional view of an electric valve according to the present application; FIG. 3 is a schematic structural view of a plug-in component in FIG. 2; FIG. 4a is a schematic structural view of a separator in FIG. 2; FIG. 4b is a schematic structural view of a gear ring in FIG. 2; FIG. 5 is a schematic structural view of an output gear carrier in FIG. 2; FIG. 6 is a schematic structural view of a bearing member in FIG. 2; FIG. 7 is a schematic view showing the cooperation of the gear ring, the output gear carrier and the bearing member in FIG. 2; FIG. 8 is a schematic sectional view of a transmission shaft in FIG. 2.

The electric valve includes a control component 1, a gear reduction mechanism 2, a valve body component 3 and a housing component 4. A valve chamber of the electric valve includes an inner chamber 30 of the valve body component and an inner chamber 40 of the housing component, and the inner chamber the housing component. The control component 1 and the gear reduction mechanism 2 are arranged in the inner chamber 40 of the housing component.

The control component 1 includes a motor 11, a lead wire 12 and a mounting plate 13. The motor 11 includes a stator 113, a rotor 114, a rotating shaft 111, an input gear 112, an upper bearing 115 and a lower bearing 116 which are both configured to position the rotating shaft 111. The stator 113 and the rotor 114 are located above the gear reduction mechanism 2. The lower bearing 116 is close to the input gear 112, and the rotating shaft 111 penetrates through the lower bearing 116. By energizing the lead wire 12, the stator 113 is energized to drive the rotor 114 to rotate circumferentially, and the rotor 114 is fixedly connected to the rotating shaft 111. The rotating shaft 111 is made by processing a stainless steel bar and is rotatable connected to the input gear 112. The "rotatably connected" herein includes that the rotating shaft 111 is fixedly connected to the input gear 112, and also includes that the rotating shaft 111 is connected to the input gear 112 by circumferentially as long as the rotating shaft 111 can drive the rotating shaft 112 to rotate. Specifically, the rotating shaft 111 may be fixed to the input gear 112 by interference fit. Besides, the rotating shaft 111 may be connected to the input gear 112 by key-groove cooperation. The motor 11 is fixedly connected to the mounting plate 13 by welding, the mounting plate 13 is fixedly connected to the housing component 4 by welding, or the mounting plate 13 may be integrally formed with the motor 11. In this way, the motor 11 is fixed by the mounting plate 13, which ensures the smooth operation of the rotating shaft 111.

The gear reduction mechanism 2 is provided in the inner chamber 40 of the housing component. The gear reduction mechanism 2 is a planetary gear mechanism, which includes a planetary gear 21, a planetary gear carrier 22 and an output gear carrier 26. The planetary gear 21 is mounted on the planetary gear carrier 22, the planetary gear 21 meshes with the input gear 112, the input gear 112 is configured to drive the planetary gear 21 to rotate circumferentially, and the planetary gear 21 is configured to drive the output gear carrier 26 to rotate circumferentially.

The valve body component 3 includes a valve body 31, a valve core 32, a first valve seat 33, a second valve seat 33' and a transmission shaft 34. The valve body 31 is substantially tubular and made by stretching a stainless steel material. The first valve seat 33 is fixed to one end of the valve body 31 by welding, and the second valve seat 33' is fixed to another end of the valve body 31 by welding. The first valve seat 33 is fixed to a first connecting pipe 36 by welding, and the second valve seat 33' is fixed to a second connecting pipe 37 by welding. One of the first connecting pipe 36 and the second connecting pipe 37 serves as a flow path inlet, and the other serves as a flow path outlet. The valve core 32 is substantially spherical, and is arranged in the inner chamber 30 of the valve body component, and is located between the first valve seat 33 and the second valve seat 33'. The valve body 31 includes a body portion 311 and an extending portion 312 extending outward from a circumferential outer wall of the body portion 311, and the extending portion 312 is substantially tubular. In this embodiment, the output gear carrier 26 is rotatably connected to the transmission shaft 34, and the transmission shaft 34 is rotatably connected to the valve core 32. Specifically, the transmission shaft 34 is substantially cylindrical rod-shaped, the transmission shaft 34 penetrates through the extending portion 312. One end of the transmission shaft 34 extends into the inner chamber 40 of the housing component and is connected to a hole portion 262 of the output gear carrier 26 by key-groove cooperation. The output gear carrier 26 is configured to drive the transmission shaft 34 to rotate circumferentially. Another end of the transmission shaft 34 extends into the inner chamber 30 of the valve body component and is connected to a groove 321 of the valve core 32 by key-groove cooperation. The transmission shaft 34 is configured to drive the valve core 32 to rotate circumferentially.

The housing component 4 includes an upper housing 41 and a lower housing 42, and the upper housing 41 and the lower housing 42 are respectively formed by stamping a stainless steel plate. A wall thickness of the lower housing 42 is larger than a wall thickness of the upper housing 41. An upper end of the lower housing 42 includes a second stepped portion 421 with a stepped surface facing upward, the upper housing 41 is placed on the second stepped portion 421, and the upper housing 41 is fixed to the lower housing 42 by welding. A lower end of the lower housing 42 includes a reduced-diameter portion 422, at least part of the reduced-diameter portion 422 is located inside the extending portion 312 of the valve body 31, and an outer wall of the reduced-diameter portion 422 is fixed to an inner wall of the extending portion 312 by welding.

In this embodiment, the valve body 31 is fixedly connected to the housing component 4, and the motor 11 is arranged in the inner chamber 40 of the housing component. The beneficial effect is that the influence of moisture on the motor 11 can be reduced, and the risk of short-circuit of the motor 11 can be reduced.

Further, as shown in FIG. 2, in this embodiment, the rotating shaft 111 is fixedly connected to the input gear 112, and a circumferential outer wall of the input gear 112 includes a sun gear 1120. The gear reduction mechanism 2 further includes a gear ring 25 and a partition plate 24, and the gear ring 25 is fixedly connected to the partition plate 24 by welding. Apparently, the gear ring 25 may be connected to the partition plate 24 by circumferentially limiting, as long as the partition plate 24 does not rotate circumferentially relative to the gear ring 25. The partition plate 24 includes a center hole 241, at least part of the lower bearing 116 is located in the center hole 241, and the lower bearing 116 is in clearance fit with the center hole 241. With this arrangement, the motor 11 can be positioned. In the specific assembly, after the motor 11 is positioned, the mounting plate 13 is welded to an inner wall of the lower housing 42 for fixation. The gear ring 25 is substantially cylindrical, the sun gear 1120 is located in an inner chamber 250 of the gear ring 25, the planetary gear 21 is located in the inner chamber 250 of the gear ring 25, and the sun gear 1120 meshes with the planetary gear 21.

As shown in FIGS. 2 and 4a, the mounting plate 13 is placed on the partition plate 24, and the mounting plate 13 includes a gap 130 located on an outer circumference of the mounting plate 13. The inner chamber 40 of the housing component includes an upper chamber 401 located above the mounting plate 13 and the inner chamber 250 of the gear ring, and the upper chamber 401 is in communication with the gap 130. The stator 113 and the rotor 114 are located in the upper chamber 401. The partition plate 24 includes a communication flow path 240 which communicates the gap 130 with the inner chamber 250 of the gear ring. The communication flow path 240 includes a through hole 242 axially penetrating through the partition plate 24 and a radial through groove 243 radially extending from the through hole 242 to a circumferential outer wall of the partition plate 24. By providing the communication flow path 240 and the gap 130, the upper chamber 401 is communicated with the inner chamber 250 of the gear ring, and fluid in the electric valve is introduced into the upper chamber 401, which is beneficial to the heat dissipation of the motor 11, and the upper chamber 401 may not form a liquid-sealing chamber, which improves the safety of the electric valve.

Further, as shown in FIG. 4a, the communication flow path 240 further includes an annular groove 244, at least two through holes 242 are defined and are arranged symmetrically about the center hole 241, and the annular groove 244 communicates with each of the through holes 242. With this arrangement, the flow capacity of the communication flow path 240 is improved.

The planetary gear carrier 22 includes a first-stage planetary gear carrier 221, the first-stage planetary gear carrier 221 includes a center through hole 2210, and a lower end of the rotating shaft 111 is located in the center through hole 2210. The gear reduction mechanism 2 further includes a positioning rod 23, which is processed by turning a metal bar. An upper end of the transmission shaft 34 includes a blind hole 343, an upper end of the positioning rod 23 is located in the center through hole 2210, and a lower end of the positioning rod 23 is located in the blind hole 343. With this arrangement, the planetary gear carrier 22 can be positioned, the operation stability of the gear reduction mechanism 2 can be improved, and the risking of getting stuck can be reduced.

Figure 10A:
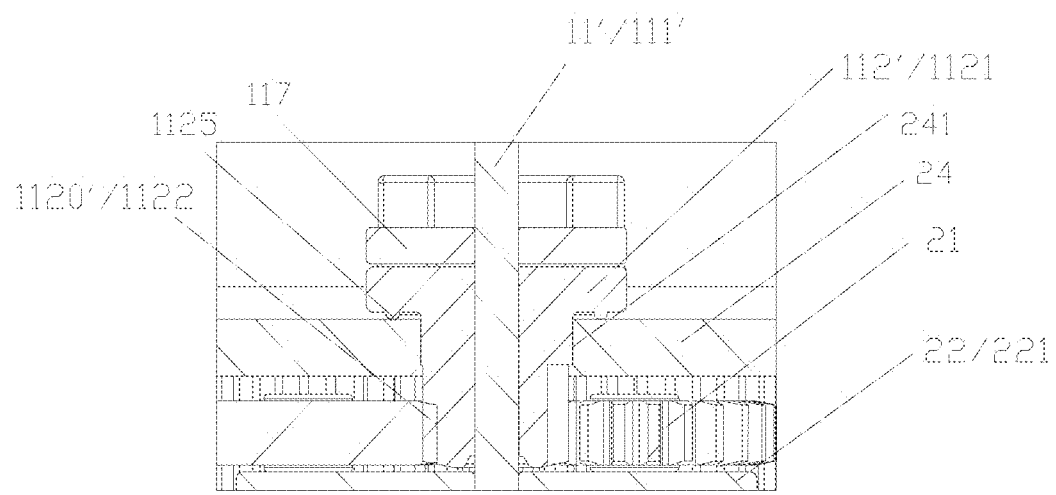
FIG. 10a is a schematic partial sectional view of a second electric valve according to the present application.
Figure 10B:
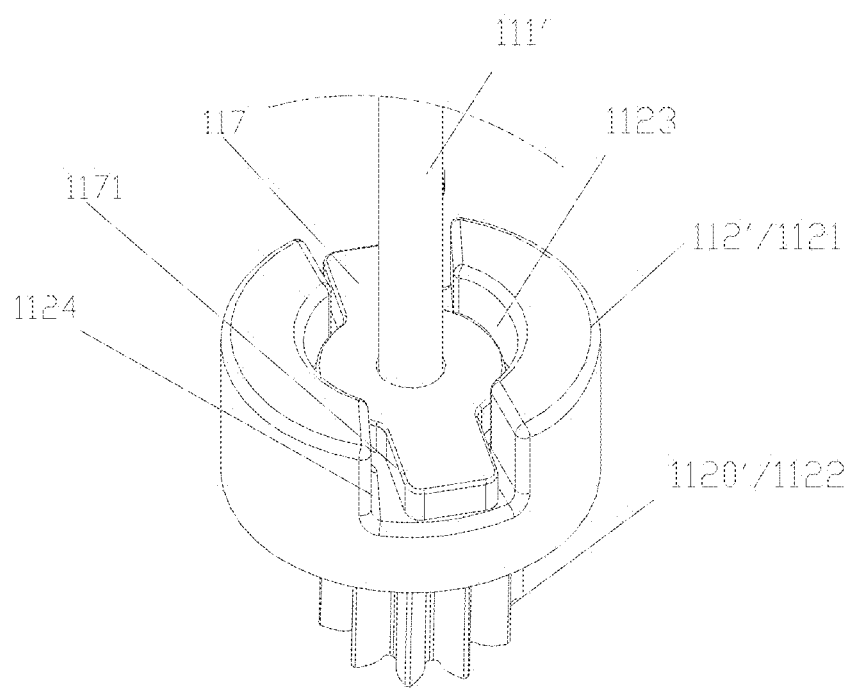

FIG. 10a is a schematic partial sectional view of a second electric valve according to the present application; FIG. 10b is a schematic view showing the cooperation of a rotating shaft, a transmission rod, and an input gear in FIG. 10a.

The difference between this embodiment and the above-mentioned embodiments lies in the structure of the control component and the connection relationship between the control component and the gear reduction mechanism.

As shown in FIGS. 10a and 10b, the motor 11' includes a rotating shaft 111' and a transmission rod 117 fixedly connected to the rotating shaft 111', the transmission rod 117 is substantially plate-shaped and includes a side wall portion 1171. An input gear 112' includes a large-diameter portion 1121 and a small-diameter portion 1122. A groove 1123 is defined at an upper end of the large-diameter portion 1121, at least part of the transmission rod 117 is located in the groove 1123, the groove 1123 includes a groove wall portion 1124 configured to abut against the side wall portion 1171, and a circumferential movement gap is present between the groove wall portion 1124 and the side wall portion 1171. A circumferential outer wall of the small-diameter portion 1122 includes a sun gear 1120', at least part of the sun gear 1120' is located in the inner chamber 250 of the gear ring, the sun gear 1120' meshes with the planetary gear 21, and the small-diameter portion 1122 penetrates through the center hole 241 of the partition plate 24.

Further, as shown in FIG. 10a, a protruding ring 1125 is provided at a lower end of the large-diameter portion 1121, a longitudinal sectional profile of the lower end of the protruding ring 1125 is substantially arc-shaped, and the protruding ring 1125 abuts against the partition plate 24. By providing the protruding ring 1125, it is beneficial to reducing the frictional force when the input gear 112' rotates circumferentially, and prolonging the service life of the input gear 112'.

Further, as shown in FIGS. 2 and 3, the electric valve further includes a plug-in component 5, and the plug-in component 5 includes a plug-in socket 51, a sealing glass 52 and a pin 53. The sealing glass 52 is fixed in the plug-in socket 51 by sintering. Specifically, the plug-in socket 51 is made of stainless steel and has a substantially hollow structure, which includes an upper portion 511, a middle portion 512 and a lower portion 513. The upper portion 511 includes a plug-in chamber 5110, the lower portion 513 includes a sealing chamber 5130, the sealing chamber 5130 is in communication with the inner chamber 40 of the housing component, and the middle portion 512 is fixed and sealed to the sealing glass 52 by sintering, which separates the plug-in chamber 5110 from the sealing chamber 5130. The pin 53 penetrates through the sealing glass 52. An upper end of the pin 53 extends into the plug-in chamber 5110 and is configured to electrically connect with an external plug-in component, and a lower end of the pin 53 extends into the sealing chamber 5130 and is configured to electrically connect with the lead wire 12 of the control component 1. The pin 53 is fixed to the sealing glass 52 by sintering.

Further, the upper housing 41 includes a protruding portion 411 protruding upward. A lower end of the plug-in socket 51 includes a first stepped portion 514 with a stepped surface facing downward, and the protruding portion 411 is fixed to the first stepped portion 514 by welding.

As shown in FIG. 2, the transmission shaft 34 penetrates through the reduced-diameter portion 422 of the lower housing 42, and a bearing member 27 is provided between the reduced-diameter portion 422 and the transmission shaft 34. The second bearing member 27 is made by wear-resistant metal material powder metallurgy. The beneficial effect of this arrangement lies in that the wear of the transmission shaft 34 during the circumferential rotation is reduced and the service life of the transmission shaft 34 is prolonged.

It is conceivable that the method of fixing the lower housing 42 to the valve body 31 may be fixing an inner wall of the reduced-diameter portion 422 to an outer wall of the extending portion 312 of the valve body 31 by welding. The transmission shaft 34 penetrates through the extending portion 312, and a bearing member 27 is provided between extending portion 312 and the transmission shaft 34. This embodiment has the same technical effect as the above embodiment.

With reference to FIG. 2, FIG. 5, and FIG. 7, one end of the transmission shaft 34 facing the control component 1 includes a first key portion 341 which is connected to the hole portion 262 of the output gear carrier 26 by key-groove cooperation, and the first key portion 341 is located in the inner chamber 40 of the housing component. The first key portion 341 has a non-circular cross section and extends into the hole portion 262 of the output gear carrier 26. Another end of the transmission shaft 34 includes a second key portion 342 which is connected to the valve core 32 by key-groove cooperation, and the second key portion 342 is located in the inner chamber 30 of the valve body component. A lower end of the second key portion 342 extends into the groove 321 of the valve core 32, and the second key portion 342 is in key-groove fit with the valve core 32.

As shown in FIG. 4b, FIG. 5, FIG. 6 and FIG. 7, in this embodiment, a limiting groove 251 is provided at a lower end of the gear ring 25. The output gear carrier 26 includes a disc-shaped body portion 261. A hole portion 262 is provided in the disc-shaped body portion 261, and the cross section of the hole portion 262 is non-circular. A protruding portion 263 is provided on one side of the disc-shaped body portion 261 facing the valve core 32. In this embodiment, the bearing member 27 includes a cylindrical portion 271 and a radially extending portion 272 extending radially outward from a circumferential outer wall of the cylindrical portion 271, the cylindrical portion 271 includes an axial through groove 274, and the axial through groove 274 communicates the inner chamber 40 of the housing component with the inner chamber 30 of the valve body component. An outer edge of the radially extending portion 272 is fixed to the inner wall of the lower housing 42 by welding, one end of the radially extending portion 272 away from the cylindrical portion 271 is in key-groove fit with the limiting groove 251, and another end of the radially extending portion 272 is in cooperation with the protruding portion 263 to limit a circumferential rotation stroke of the output gear carrier 26.

In the above embodiment, since the radially extending portion 272 of the bearing member 27 is fixed to the lower housing 42 by welding, on the one hand, the gear ring 25 is circumferentially limited due to the key-groove fit between the radially extending portion 272 and the limiting groove 251 of the gear ring 25, and on the other hand, the protruding portion 263 is limited by the radially extending portion 272, thus limiting the circumferential rotation stroke of the output gear carrier 26, that is, limiting a circumferential rotation stroke of the transmission shaft 34. This arrangement can limit the fully open position and the fully closed position of the valve core 32, and realize the fully open, fully close and flow regulating functions of the electric valve.

Figure 9:
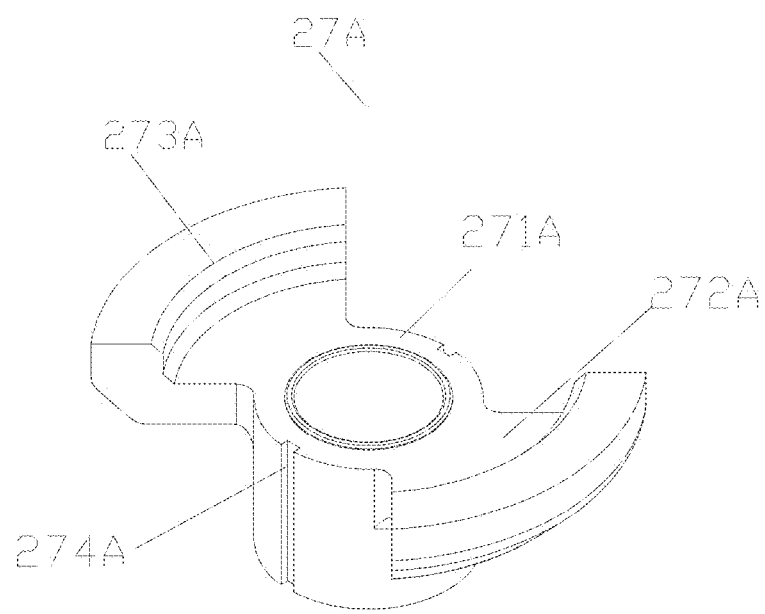
FIG. 9 is a schematic structural view of another bearing member.

FIG. 9 is a schematic structural view of another bearing member.

As shown in FIG. 9, a bearing member 27A includes a cylindrical portion 271A, a radially extending portion 272A extending radially outward from a circumferential outer wall of the cylindrical portion 271A, and an axially extending portion 273A extending axially upward from the radially extending portion 272A. The cylindrical portion 271A includes an axial through groove 274A, and the axial through groove 274A communicates the inner chamber 40 of the housing component with the inner chamber 30 of the valve body component. An outer wall of the axially extending portion 273A is fixed to the inner wall of the lower housing 42 by welding, the axially extending portion 273A is located in the limiting groove 251 and is in key-groove fit with the limiting groove 251, and the radially extending portion 272 cooperates with the protruding portion 263 to limit the circumferential rotation stroke of the output gear carrier 26.

Further, as shown in FIG. 5, two protruding portions 263 are provided, and the two protruding portions are arranged symmetrically relative to the central axis of the hole portion 262. Such arrangement is beneficial to smooth rotation and reliable positioning of the output gear carrier in the circumferential direction. In addition, the protruding portions 263 and the disc-shaped body portion 261 are integrally formed by plastic injection molding or metal powder metallurgy, which is beneficial to enhancing the strength of the output gear carrier and making the limiting more reliable.

Figure 11:
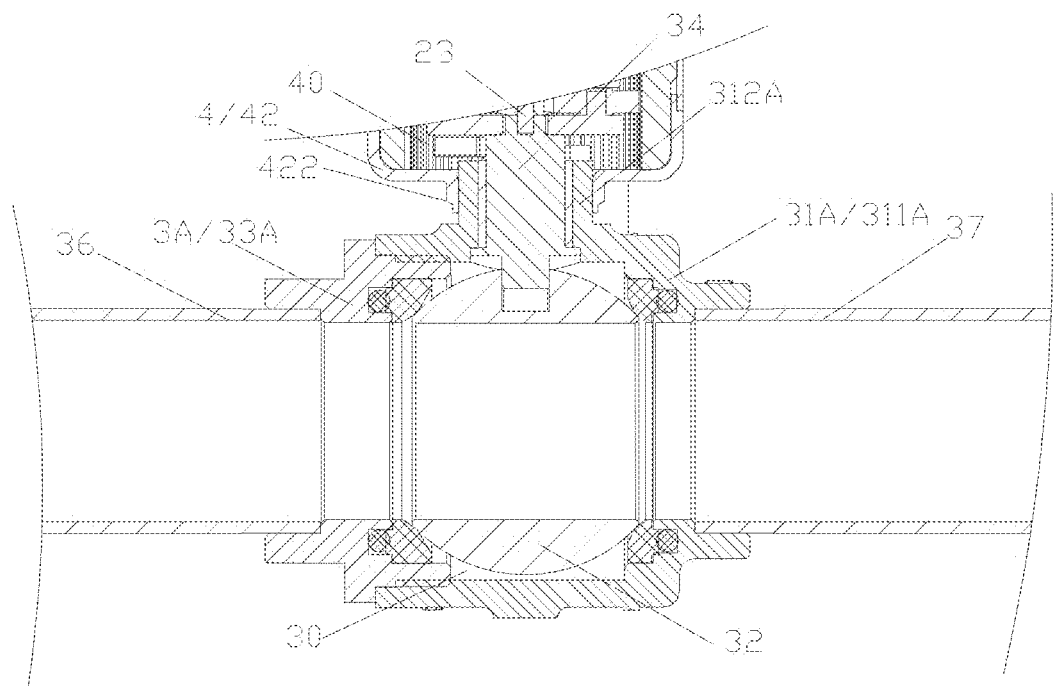
FIG. 11 is a schematic partial sectional view of a third electric valve according to the present application.
Figure 12:
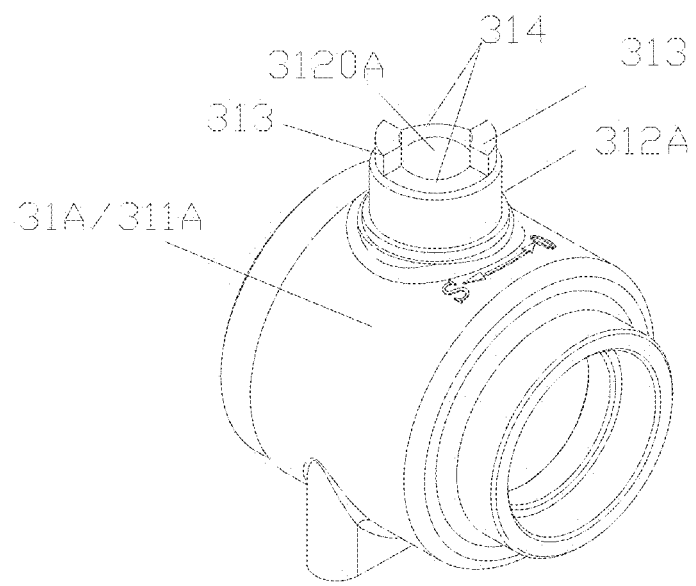
FIG. 12 is a schematic structural view of a valve body in FIG. 11.
Figure 13:
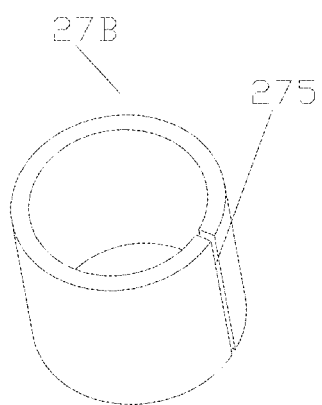
FIG. 13 is a schematic structural view of the bearing member in FIG. 11.

FIG. 11 is a schematic partial sectional view of a third electric valve according to the present application; FIG. 12 is a schematic structural view of the valve body in FIG. 11; and FIG. 13 is a schematic structural view of the bearing member in FIG. 11.

The difference between this embodiment and the above-mentioned embodiments lies in the structure and the stopping method of the valve body component and the bearing member.

As shown in FIGS. 10 to 12, in this embodiment, the valve body component 3A includes a valve body 31A, a transmission shaft 34, a first valve seat 33A, and a valve core 32. The valve body 31A is made of metal material by forging or casting, and the first valve seat 33A is made of metal material by turning, forging or casting. The valve body 31A includes a substantially cylindrical body portion 311A and a protruding portion 312A extending from an outer wall of the body portion 311A toward the control component 1. The protruding portion 312A is provided with an axial through hole 3120A, the cross section of the axial through hole 3120A is circular, and the transmission shaft 34 penetrates through the axial through hole 3120A. In this embodiment, an inner wall of the reduced-diameter portion 422 of the lower housing 42 is fixed to an outer wall of the extending portion 312A by welding, a bearing member 27B is provided between the extending portion 312A and the transmission shaft 34, the bearing member 27B is formed by bending a metal sheet, and the bearing member 27B has a notch portion 275 which communicates the inner chamber 40 of the housing component with the inner chamber 30 of the valve body component.

In this embodiment, an upper end of the extending portion 312A includes a limiting boss 313, and two limiting bosses 313 are provided and are arranged symmetrically relative to a center axis of the axial through hole 3120A. A recess portion 314 is formed between the two limiting bosses 313, the recess portion 314 is located in a circumferential space between the two limiting bosses 313, the protruding portion 263 of the output gear carrier 26 is placed in the recess portion 314, and the protruding portion 263 is configured to abut against the limiting bosses 313 to limit the circumferential rotation stroke of the output gear carrier 26. In this embodiment, the limiting bosses 313 are integrated with the valve body 31A, no special machining for the bearing member is required, and the bearing member is easy to process.

The principle and the embodiments of the present application are illustrated herein by specific examples. The above description of examples is only intended to facilitate the understanding of the method and spirit of the present application. It should be noted that, for those skilled in the art, many modifications and improvements may be made to the present disclosure without departing from the principle of the present disclosure, and these modifications and improvements are also deemed to fall into the protection scope of the present disclosure defined by the claims.

What is claimed is:

1. An electric valve, comprising a housing component, a valve body component, a control component and a gear reduction mechanism,
   wherein the housing component is fixedly connected to the valve body component, a valve chamber of the electric valve comprises an inner chamber of the housing component and an inner chamber of the valve body component, and the inner chamber of the housing component is in communication with the inner chamber of the valve body component;
   the control component and the gear reduction mechanism are arranged in the inner chamber of the housing component, the control component comprises a motor and an input gear, the motor is rotatably connected with the input gear, a stator and a rotor of the motor are located above the gear reduction mechanism, the gear reduction mechanism comprises a planetary gear and an output gear carrier, the input gear meshes with the planetary gear, and the planetary gear is configured to drive the output gear carrier to rotate; and
   the valve body component comprises a valve body, a first valve seat, a valve core and a transmission shaft, the valve body is fixedly connected to the first valve seat, the valve core is arranged in the inner chamber of the valve body component, the output gear carrier is rotatably connected to the transmission shaft, and the transmission shaft is rotatably connected to the valve core,
   one end of the transmission shaft extends into a hole portion of the output gear carrier, the output gear carrier is configured to drive the transmission shaft to rotate, another end of the transmission shaft extends into a groove of the valve core, and the transmission shaft is configured to drive the valve core to rotate,
   the motor comprises a rotating shaft, the rotating shaft is fixedly connected to the input gear, a circumferential outer wall of the input gear comprises a sun gear, the gear reduction mechanism further comprises a gear ring and a partition plate, the gear ring is fixedly connected to the partition plate, the gear ring is substantially cylindrical, at least part of the sun gear is located in an inner chamber of the gear ring, the planetary gear is located in the inner chamber of the gear ring, the sun gear meshes with the planetary gear, the partition plate comprises a center hole, the motor comprises a lower bearing close to the input gear, at least part of the lower bearing is located in the center hole, and the lower bearing is in clearance fit with the center hole.

2. The electric valve according to the claim 1, wherein the control component further comprises a mounting plate, the mounting plate is placed on the partition plate, the mounting plate comprises a gap located on an outer circumference of the mounting plate, the motor is fixedly connected to the mounting plate, the mounting plate is fixedly connected to the housing component, the inner chamber of the housing component comprises an upper chamber located above the mounting plate and the inner chamber of the gear ring, the upper chamber is in communication with the gap, the stator and the rotor are located in the upper chamber, the gear ring is located in a lower chamber, the partition plate comprises a communication flow path which communicates the gap with the inner chamber of the gear ring, and the communication flow path comprises a through hole axially penetrating through the partition plate and a through groove radially extending from the through hole to a circumferential outer wall of the partition plate.

3. The electric valve according to the claim 2, wherein the communication flow path further comprises an annular groove, at least two through holes are defined and are arranged symmetrically relative to the center hole, and the annular groove communicates with each of the at least two through holes.

4. The electric valve according to the claim 1, wherein the gear reduction mechanism further comprises a planetary gear carrier and a positioning rod, the planetary gear is arranged on the planetary gear carrier, the planetary gear carrier comprises a first-stage planetary gear carrier, the first-stage planetary gear carrier comprises a center through hole, a lower end of the rotating shaft is located in the center through hole, an upper end of the transmission shaft comprises a blind hole, an upper end of the positioning rod is located in the center through hole, and a lower end of the positioning rod is located in the blind hole.

5. The electric valve according to claim 1, wherein the valve body is substantially tubular, the valve body is made by stretching a stainless steel material, the valve body comprises a body portion and an extending portion extending from a circumferential outer edge of the body portion, the extending portion is substantially tubular, and the transmission shaft penetrates through the extending portion; and
the lower housing of the housing component comprises a reduced-diameter portion, an inner wall of the extending portion is fixed to an outer wall of the reduced-diameter portion by welding, a bearing member is provided between the reduced-diameter portion and the transmission shaft, or, an outer wall of the extending portion is fixed to an inner wall of the reduced-diameter portion by welding, and the bearing member is provided between the extending portion and the transmission shaft.

6. The electric valve according to the claim 5, wherein the output gear carrier comprises a disc-shaped body portion, the hole portion of the output gear carrier is arranged on the disc-shaped body portion, a cross section of the hole portion is non-circular, a protruding portion is provided on one side of the disc-shaped body portion facing the valve core, the bearing member comprises a cylindrical portion and a radially extending portion extending radially from the cylindrical portion, the cylindrical portion comprises an axial through groove, the axial through groove communicates the inner chamber of the housing component with the inner chamber of the valve body component, an outer edge of the radially extending portion is fixed to an inner wall of the lower housing by welding, one end of the radially extending portion away from the cylindrical portion is located in a limiting groove at a lower end of the gear ring, and the protruding portion is configured to abut against another end of the radially extending portion to limit a circumferential rotation stroke of the output gear carrier.

7. The electric valve according to the claim 5, wherein the output gear carrier comprises a disc-shaped body portion, the hole portion of the output gear carrier is arranged on the disc-shaped body portion, a cross section of the hole portion is non-circular, a protruding portion is provided on one side of the disc-shaped body portion facing the valve core, the bearing member comprises a cylindrical portion, a radially extending portion extending radially from the cylindrical portion and an axially extending portion extending axially upward from the radially extending portion, the cylindrical portion comprises an axial through groove, the axial through groove communicates the inner chamber of the housing component with the inner chamber of the valve body component, the protruding portion is configured to abut against the radially extending portion to limit a circumferential rotation stroke of the output gear carrier, an outer wall of the axially extending portion is fixed to an inner wall of the lower housing by welding, and the axially extending portion is located in a limiting groove at a lower end of the gear ring.

8. The electric valve according to claim 1, wherein a blank of the valve body is made by forging or casting a metal material, the valve body comprises a body portion and an extending portion facing towards the control component, the extending portion comprises a through hole, and the transmission shaft penetrates through the through hole; and
a lower housing of the housing component comprises a reduced-diameter portion, an outer wall of the extending portion is fixed to an inner wall of the reduced-diameter portion by welding, a bearing member is provided between the extending portion and the transmission shaft, the bearing member comprises an axially penetrating gap, and the gap communicates the inner chamber of the housing component with the inner chamber of the valve body component.

9. The electric valve according to the claim 8, wherein the output gear carrier comprises a disc-shaped body portion, a hole portion of the output gear carrier is arranged on the disc-shaped body portion, a cross section of the hole portion is non-circular, a protruding portion is provided on one side of the disc-shaped body portion facing the valve core, an upper end of the extending portion comprises a boss, and the protruding portion is configured to abut against the boss to limit a circumferential rotation stroke of the output gear carrier.

10. An electric valve, comprising a housing component, a valve body component, a control component and a gear reduction mechanism,
wherein the housing component is fixedly connected to the valve body component, a valve chamber of the electric valve comprises an inner chamber of the housing component and an inner chamber of the valve body component, and the inner chamber of the housing component is in communication with the inner chamber of the valve body component;
the control component and the gear reduction mechanism are arranged in the inner chamber of the housing component, the control component comprises a motor and an input gear, the motor is rotatably connected with the input gear, a stator and a rotor of the motor are located above the gear reduction mechanism, the gear reduction mechanism comprises a planetary gear and an output gear carrier, the input gear meshes with the planetary gear, and the planetary gear is configured to drive the output gear carrier to rotate; and the valve body component comprises a valve body, a first valve seat, a valve core and a transmission shaft, the valve body is fixedly connected to the first valve seat, the valve core is arranged in the inner chamber of the valve body component, the output gear carrier is rotatably connected to the transmission shaft, and the transmission shaft is rotatably connected to the valve core, one end of the transmission shaft extends into a hole portion of the output gear carrier, the output gear carrier is configured to drive the transmission shaft to rotate, another end of the transmission shaft extends into a groove of the valve core, and the transmission shaft is configured to drive the valve core to rotate, the motor comprises a rotating shaft, the gear reduction mechanism further comprises a planetary gear carrier and a positioning rod, the planetary gear is arranged on the planetary gear carrier, the planetary gear carrier comprises a first-stage planetary gear carrier, the first-stage planetary gear carrier comprises a center through hole, a lower end of the rotating shaft is located in the center through hole, an upper end of the transmission shaft comprises a blind hole, an upper end of the positioning rod is located in the center through hole, and a lower end of the positioning rod is located in the blind hole.

11. The electric valve according to the claim 10, further comprising a plug-in component, wherein the plug-in component comprises a plug-in socket, a sealing glass and a pin, the plug-in socket is fixed to the housing component by welding, the plug-in socket comprises an upper portion, a middle portion and a lower portion, the upper portion comprises a plug-in chamber, the sealing glass is fixed in the middle portion by sintering, the lower portion comprises a sealing chamber, the sealing glass is fixed to the pin by sintering, the pin penetrates through the sealing glass, an upper end of the pin is located in the plug-in chamber, a lower end of the pin is located in the sealing chamber, and the lower end of the pin is electrically connected to a lead wire of the control component; and the housing component comprises an upper housing and a lower housing, the upper housing is fixed to the lower housing by welding, an upper end of the upper housing comprises a protruding portion protruding upward, a lower end of the plug-in socket comprises a first stepped portion with a stepped surface facing downward, the protruding portion is fixed to the first stepped portion by welding, an upper end of the lower housing comprises a second stepped portion with a stepped surface facing upward, the upper housing is placed on the second stepped portion, the upper housing is fixed to the second stepped portion by welding, and the lower housing is fixed to the valve body by welding.

12. The electric valve according to claim 10, wherein the valve body is substantially tubular, the valve body is made by stretching a stainless steel material, the valve body comprises a body portion and an extending portion extending from a circumferential outer edge of the body portion, the extending portion is substantially tubular, and the transmission shaft penetrates through the extending portion; and the lower housing of the housing component comprises a reduced-diameter portion, an inner wall of the extending portion is fixed to an outer wall of the reduced-diameter portion by welding, a bearing member is provided between the reduced-diameter portion and the transmission shaft, or, an outer wall of the extending portion is fixed to an inner wall of the reduced-diameter portion by welding, and the bearing member is provided between the extending portion and the transmission shaft.

13. The electric valve according to the claim 12, wherein the output gear carrier comprises a disc-shaped body portion, the hole portion of the output gear carrier is arranged on the disc-shaped body portion, a cross section of the hole portion is non-circular, a protruding portion is provided on one side of the disc-shaped body portion facing the valve core, the bearing member comprises a cylindrical portion and a radially extending portion extending radially from the cylindrical portion, the cylindrical portion comprises an axial through groove, the axial through groove communicates the inner chamber of the housing component with the inner chamber of the valve body component, an outer edge of the radially extending portion is fixed to an inner wall of the lower housing by welding, one end of the radially extending portion away from the cylindrical portion is located in a limiting groove at a lower end of the gear ring, and the protruding portion is configured to abut against another end of the radially extending portion to limit a circumferential rotation stroke of the output gear carrier.

14. The electric valve according to the claim 12, wherein the output gear carrier comprises a disc-shaped body portion, the hole portion of the output gear carrier is arranged on the disc-shaped body portion, a cross section of the hole portion is non-circular, a protruding portion is provided on one side of the disc-shaped body portion facing the valve core, the bearing member comprises a cylindrical portion, a radially extending portion extending radially from the cylindrical portion and an axially extending portion extending axially upward from the radially extending portion, the cylindrical portion comprises an axial through groove, the axial through groove communicates the inner chamber of the housing component with the inner chamber of the valve body component, the protruding portion is configured to abut against the radially extending portion to limit a circumferential rotation stroke of the output gear carrier, an outer wall of the axially extending portion is fixed to an inner wall of the lower housing by welding, and the axially extending portion is located in a limiting groove at a lower end of the gear ring.

15. The electric valve according to claim 10, wherein a blank of the valve body is made by forging or casting a metal material, the valve body comprises a body portion and an extending portion facing towards the control component, the extending portion comprises a through hole, and the transmission shaft penetrates through the through hole; and a lower housing of the housing component comprises a reduced-diameter portion, an outer wall of the extending portion is fixed to an inner wall of the reduced-diameter portion by welding, a bearing member is provided between the extending portion and the transmission shaft, the bearing member comprises an axially penetrating gap, and the gap communicates the inner chamber of the housing component with the inner chamber of the valve body component.

16. The electric valve according to the claim 15, wherein the output gear carrier comprises a disc-shaped body portion, a hole portion of the output gear carrier is arranged on the disc-shaped body portion, a cross section of the hole portion is non-circular, a protruding portion is provided on one side of the disc-shaped body portion facing the valve core, an upper end of the extending portion comprises a boss, and the protruding portion is configured to abut against the boss to limit a circumferential rotation stroke of the output gear carrier.

17. An electric valve, comprising a housing component, a valve body component, a control component and a gear reduction mechanism, wherein the housing component is fixedly connected to the valve body component, a valve chamber of the electric valve comprises an inner chamber of the housing component and an inner chamber of the valve body component, and the inner chamber of the housing component is in communication with the inner chamber of the valve body component;

the control component and the gear reduction mechanism are arranged in the inner chamber of the housing component, the control component comprises a motor and an input gear, the motor is rotatably connected with the input gear, a stator and a rotor of the motor are located above the gear reduction mechanism, the gear reduction mechanism comprises a planetary gear and an output gear carrier, the input gear meshes with the planetary gear, and the planetary gear is configured to drive the output gear carrier to rotate; and the valve body component comprises a valve body, a first valve seat, a valve core and a transmission shaft, the valve body is fixedly connected to the first valve seat, the valve core is arranged in the inner chamber of the valve body component, the output gear carrier is rotatably connected to the transmission shaft, and the transmission shaft is rotatably connected to the valve core, one end of the transmission shaft extends into a hole portion of the output gear carrier, the output gear carrier is configured to drive the transmission shaft to rotate, another end of the transmission shaft extends into a groove of the valve core, and the transmission shaft is configured to drive the valve core to rotate, the electric valve further comprises a plug-in component, wherein the plug-in component comprises a plug-in socket, a sealing glass and a pin, the plug-in socket is fixed to the housing component by welding, the plug-in socket comprises an upper portion, a middle portion and a lower portion, the upper portion comprises a plug-in chamber, the sealing glass is fixed in the middle portion by sintering, the lower portion comprises a sealing chamber, the sealing glass is fixed to the pin by sintering, the pin penetrates through the sealing glass, an upper end of the pin is located in the plug-in chamber, a lower end of the pin is located in the sealing chamber, and the lower end of the pin is electrically connected to a lead wire of the control component; and the housing component comprises an upper housing and a lower housing, the upper housing is fixed to the lower housing by welding, an upper end of the upper housing comprises a protruding portion protruding upward, a lower end of the plug-in socket comprises a first stepped portion with a stepped surface facing downward, the protruding portion is fixed to the first stepped portion by welding, an upper end of the lower housing comprises a second stepped portion with a stepped surface facing upward, the upper housing is placed on the second stepped portion, the upper housing is fixed to the second stepped portion by welding, and the lower housing is fixed to the valve body by welding.

18. The electric valve according to the claim 17, wherein the motor comprises a rotating shaft, the rotating shaft is fixedly connected to the input gear, a circumferential outer wall of the input gear comprises a sun gear, the gear reduction mechanism further comprises a gear ring and a partition plate, the gear ring is fixedly connected to the partition plate, the gear ring is substantially cylindrical, at least part of the sun gear is located in an inner chamber of the gear ring, the planetary gear is located in the inner chamber of the gear ring, the sun gear meshes with the planetary gear, the partition plate comprises a center hole, the motor comprises a lower bearing close to the input gear, at least part of the lower bearing is located in the center hole, and the lower bearing is in clearance fit with the center hole.

19. The electric valve according to the claim 18, wherein the control component further comprises a mounting plate, the mounting plate is placed on the partition plate, the mounting plate comprises a gap located on an outer circumference of the mounting plate, the motor is fixedly connected to the mounting plate, the mounting plate is fixedly connected to the housing component, the inner chamber of the housing component comprises an upper chamber located above the mounting plate and the inner chamber of the gear ring, the upper chamber is in communication with the gap, the stator and the rotor are located in the upper chamber, the gear ring is located in a lower chamber, the partition plate comprises a communication flow path which communicates the gap with the inner chamber of the gear ring, and the communication flow path comprises a through hole axially penetrating through the partition plate and a through groove radially extending from the through hole to a circumferential outer wall of the partition plate.

20. The electric valve according to the claim 19, wherein the communication flow path further comprises an annular groove, at least two through holes are defined and are arranged symmetrically relative to the center hole, and the annular groove communicates with each of the at least two through holes.

21. The electric valve according to the claim 17, wherein the motor comprises a rotating shaft and a transmission rod fixedly connected to the rotating shaft, the transmission rod comprises a side wall portion, the input gear comprises a large-diameter portion and a small-diameter portion, a groove is defined at an upper end of the large-diameter portion, at least part of the transmission rod is located in the groove, the groove comprises a groove wall portion configured to abut against the side wall portion, a circumferential movement gap is defined between the groove wall portion and the side wall portion, a circumferential outer wall of the small-diameter portion comprises a sun gear, the gear reduction mechanism further comprises a gear ring and a partition plate, the gear ring is fixedly connected to the partition plate, the gear ring is substantially cylindrical, at least part of the sun gear is located in an inner chamber of the gear ring, the planetary gear is located in the inner chamber of the gear ring, the sun gear meshes with the planetary gear, the partition plate comprises a center hole, and the small-diameter portion penetrates through the center hole.

22. The electric valve according to the claim 21, wherein a protruding ring is provided at a lower end of the large-diameter portion, a longitudinal sectional profile of a lower end of the protruding ring is substantially arc-shaped, and the protruding ring abuts against the partition plate.

23. The electric valve according to the claim 17, wherein the valve body is substantially tubular, the valve body is made by stretching a stainless steel material, the valve body comprises a body portion and an extending portion extending from a circumferential outer edge of the body portion, the extending portion is substantially tubular, and the transmission shaft penetrates through the extending portion; and the lower housing of the housing component comprises a reduced-diameter portion, an inner wall of the extending portion is fixed to an outer wall of the reduced-diameter portion by welding, a bearing member is provided between the reduced-diameter portion and the transmission shaft, or, an outer wall of the extending portion is fixed to an inner wall of the reduced-diameter portion by welding, and the bearing member is provided between the extending portion and the transmission shaft.

24. The electric valve according to the claim 23, wherein the output gear carrier comprises a disc-shaped body portion, the hole portion of the output gear carrier is arranged on the disc-shaped body portion, a cross section of the hole portion is non-circular, a protruding portion is provided on one side of the disc-shaped body portion facing the valve core, the bearing member comprises a cylindrical portion and a radially extending portion extending radially from the cylindrical portion, the cylindrical portion comprises an axial through groove, the axial through groove communicates the inner chamber of the housing component with the inner chamber of the valve body component, an outer edge of the radially extending portion is fixed to an inner wall of the lower housing by welding, one end of the radially extending portion away from the cylindrical portion is located in a limiting groove at a lower end of the gear ring, and the protruding portion is configured to abut against another end of the radially extending portion to limit a circumferential rotation stroke of the output gear carrier.

25. The electric valve according to the claim 23, wherein the output gear carrier comprises a disc-shaped body portion, the hole portion of the output gear carrier is arranged on the disc-shaped body portion, a cross section of the hole portion is non-circular, a protruding portion is provided on one side of the disc-shaped body portion facing the valve core, the bearing member comprises a cylindrical portion, a radially extending portion extending radially from the cylindrical portion and an axially extending portion extending axially upward from the radially extending portion, the cylindrical portion comprises an axial through groove, the axial through groove communicates the inner chamber of the housing component with the inner chamber of the valve body component, the protruding portion is configured to abut against the radially extending portion to limit a circumferential rotation stroke of the output gear carrier, an outer wall of the axially extending portion is fixed to an inner wall of the lower housing by welding, and the axially extending portion is located in a limiting groove at a lower end of the gear ring.

26. The electric valve according to claim 17, wherein a blank of the valve body is made by forging or casting a metal material, the valve body comprises a body portion and an extending portion facing towards the control component, the extending portion comprises a through hole, and the transmission shaft penetrates through the through hole; and a lower housing of the housing component comprises a reduced-diameter portion, an outer wall of the extending portion is fixed to an inner wall of the reduced-diameter portion by welding, a bearing member is provided between the extending portion and the transmission shaft, the bearing member comprises an axially penetrating gap, and the gap communicates the inner chamber of the housing component with the inner chamber of the valve body component.

27. The electric valve according to the claim 26, wherein the output gear carrier comprises a disc-shaped body portion, a hole portion of the output gear carrier is arranged on the disc-shaped body portion, a cross section of the hole portion is non-circular, a protruding portion is provided on one side of the disc-shaped body portion facing the valve core, an upper end of the extending portion comprises a boss, and the protruding portion is configured to abut against the boss to limit a circumferential rotation stroke of the output gear carrier.

\* \* \* \* \*